United States Patent [19]

Crigger

[11] Patent Number: 4,650,707
[45] Date of Patent: Mar. 17, 1987

[54] TEMPERATURE INDICATION MEANS FOR FIRE FIGHTERS

[75] Inventor: James Crigger, Carteret, N.J.
[73] Assignee: Thermotech D.L.C., Inc., Carteret, N.J.
[21] Appl. No.: 738,457
[22] Filed: May 28, 1985
[51] Int. Cl.⁴ ............................................. B32B 3/06
[52] U.S. Cl. ..................................... 428/100; 428/913
[58] Field of Search ................... 428/100, 913; 73/356; 116/207; 2/216

[56] References Cited

U.S. PATENT DOCUMENTS

| | | | |
|---|---|---|---|
| 3,980,581 | 9/1976 | Godsey, Jr. et al. | 252/408 |
| 3,998,098 | 12/1976 | Chilton | 73/356 |
| 4,070,912 | 1/1978 | McNaughton | 73/356 |
| 4,198,861 | 4/1980 | Mung-Kuen Luk | 73/356 |
| 4,301,054 | 11/1981 | Burley et al. | 260/29.4 UA |
| 4,339,207 | 7/1982 | Hof et al. | 374/160 |
| 4,362,645 | 12/1982 | Hof et al. | 252/408.1 |
| 4,385,844 | 5/1983 | Fergason | 374/160 |
| 4,509,533 | 4/1985 | Chervitz | 128/736 |

*Primary Examiner*—John E. Kittle
*Assistant Examiner*—Patrick J. Ryan
*Attorney, Agent, or Firm*—Arthur L. Plevy

[57] ABSTRACT

There is disclosed a temperature indication strip having a top sheet secured to a bottom sheet. The top sheet contains designated areas of a particular background color which is imprinted thereon using a high temperature ink. The top sheet is transparent, and when the background areas are imprinted on the top sheet, a reference numeral is formed in each area. Secured to the bottom sheet and position beneath the transparent reference numeral of the top sheet is a coated member. The member consists of a sheet of paper which is of the same color as the background color on the top sheet and which is coated with a temperature sensitive varnish or lacquer. The lacquer is such that it will evaporate at a given temperature. Upon evaporation of the lacquer, the paper sheet effectively causes the numeral to disappear, and hence the entire area assumes the color of the background. In this manner the numeral blends into the area indicating to the user that the temperature indicative of the area has been reached. The entire strip is secured to the uniform of a fire fighter so that he will have a visual indication of the temperature in which he is operating.

14 Claims, 5 Drawing Figures

TEMPERATURE INDICATION MEANS FOR FIRE FIGHTERS

BACKGROUND OF THE INVENTION

This invention relates to temperature indicating means and more particularly to a band or strip of temperature sensitive material which can be mounted or secured to a fire fighter's uniform for providing an indication to the user of the temperature of the environment in which he is operating.

As one knows, each year many lives are lost due to fire including the lives of fire fighters who oftentimes are severely injured based on the tremendous flucuations in temperature which can occur during a typical fire.

In view of such circumstances, fire fighters wear protective clothing which function to isolate the body of the fire fighter from the excessive temperatures. In any event, it is known that temperatures beyond certain limitations can result in serious damage to both the fire fighter's uniform as well as his person.

Based on prior art technology, there is no reasonable or convenient way of providing a temperature indication to a fire fighter, and if such a person exposes himself for a prolonged period to excessive temperatures, serious injuries may result. According to studies, it has been determined that the fire fighter is in danger with conventional fire fighting uniforms when he is exposed to temperatures in excess of 300 degrees F. At a temperature of 300 degrees F., the fire fighter can operate in such an environment for a relatively short period, and if continued exposure occurs, he would be in danger.

Temperatures above 300 degrees F. as 400 degrees F. present even greater problems and place the fire fighter in greater danger. When temperatures approach 500 degrees F. or greater, this is a definite danger zone and no person or equipment should be exposed to such temperatures for any length of time. Thus in operating with temperatures close to 500 degrees F., the fire fighter's outfit will shrink and injury becomes unavoidable. In view of such circumstances, it has been determined that a temperature indicating means to be secured to the fire fighters uniform which will inform the fire fighter of the operating temperature would be extremely beneficial in saving lives and assuring the overall safety of the fire fighter.

The prior art is replete with numerous devices for indicating temperature apart from the conventional thermometer. For example, LCD devices have been extensively employed in the prior art as temperature indicating devices and have been used to monitor body temperature and other temperatures as well.

See for example, U.S. Pat. No. 4,140,016 entitled NOVEL COMPOSITIONS, DEVICES AND METHOD issued Feb. 20, 1979 to J. L. Ferguson. This patent shows a temperature sensing device which employs an inert compound in mixture with nematic type liquid crystal compounds. Liquid crystal compounds exhibit color changes with temperature to enable one to provide an indication of the temperature by a changing color.

Other patents as U.S. Pat. No. 4,220,680 entitled MULTILAYERED STRUCTURE INCORPORATING A THERMOMETER issued on Sept. 2, 1980 to P. E. Corsi. This patent shows a multiple layered structure of plastic material including a liquid crystal temperature indicator to provide a strip for indicating temperature. The liquid crystals change color as the temperature varies. In any event, there are other patents which show various devices which can be used to monitor temperature and which employ liquid crystal devices. See for example, U.S. Pat. Nos. 3,999,838, 3,114,836, 3,951,133, and 3,802,945.

Essentially, most of the above noted patents employ liquid crystal devices which may be mixed with various other substances to provide a temperature indication by the color change accommodated by liquid crystals when subjected to varying temperatures. As one can ascertain, such devices present problems in that in order to inform a fire fighter of a dangerous temperature condition, he has to visualize a color accurately, and therefore he may not be able to inform himself of the temperature by utilizing prior art liquid crystal techniques.

As one can ascertain, based on the nature of the fire and operation of a fire fighter in battling a blaze, such liquid crystal devices may present great problems in that color change cannot be readily perceived. The devices are basically reflective devices which may confuse a fire fighter as to the temperature of the environment.

It is, therefore, an object of the present invention to provide a temperature indicating means which is extremely reliable in operation, which provides an accurate means of indicating a temperature range and which is capable of being conveniently secured to the uniform of a fire fighter. The apparatus to be described is simple to manufacture while providing a positive indication of the temperature environment in which fire fighter is operating.

BRIEF DESCRIPTION OF THE PREFERRED EMBODIMENT

A temperature indicating device comprising a multi-layered sheet material comprising a top layer and a bottom layer, said top layer being a transparent flexible material having imprinted on a surface thereof a plurality of defined colored areas, with each of said areas associated with a reference numeral, where each reference numeral is surrounded by said imprinted color area, said bottom layer having secured thereto a plurality of laquered members each associated with a given one of said given areas, with each one of said lacquered members underlying an associated one of said given areas to allow said user to view said reference numeral as surrounded by said colored area, each of said lacquered members coated with a lacquer which evaporates at a given temperature different from that of another member, whereby when said given temperature is reached said lacquer will evaporate to cause said member to assume the color of said colored area to thereby effectively prevent one from viewing said numeral to give one an indication of the temperature achieved when said numeral cannot be viewed.

DETAILED DESCRIPTION OF THE FIGURES

Figure 1:
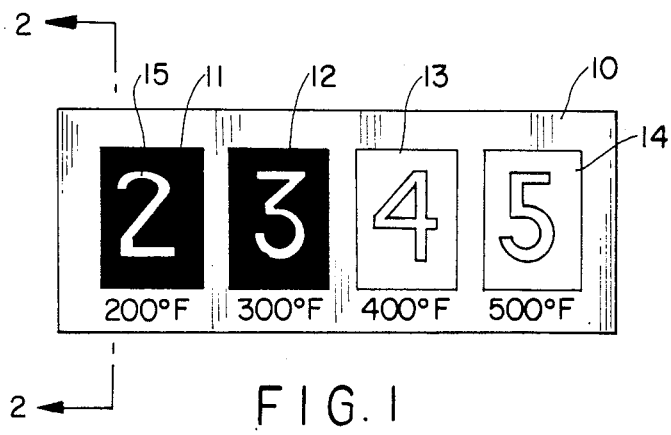
FIG. 1 is a front plan view of the temperature indication means according to this invention.

Referring to FIG. 1, there is shown a top plan view of a temperature indicating strip according to this invention.

Essentially, the strip consists of a top surface member 10 which is a high temperature plastic sheet and which contains four areas 11 to 14. Each area has a central numeral 15 indicative of a temperature level. For example, the first area 11 has the number 2 formed thereon, the second area has the number 3, the third area has the number 4 and the fourth area the number 5. Each number stands for a temperature range. For example, 2 stands for 200 degrees F., 3 stands for 300 degrees F. and so on.

The numbers are surrounded by a black border which is imprinted within the square or rectangle containing the number. The numeral is formed within the square or rectangle by means of a clear plastic area. Underlying the clear plastic area is a member coated with a colored lacquer or temperature sensitive varnish. Such temperature sensitive varnishes or lacquers are well known and are utilized extensively to determine a temperature range. The lacquers or varnishes evaporate or liquify when they are subjected to a temperature within the operating range.

The member is a porous piece of paper or a paper sheet which is colored so that it has the same color as the background area. The top surface of the member is then coated with the lacquer or varnish which may be white or a light grey. Hence the transparent numeral on the top sheet overlies the white background area of the lacquer, and the numeral is, therefore, visually apparent. When the temperature is reached, the lacquer evaporates, and since the paper sheet is the same color as the background, the numeral effectively disappears. Therefore, the entire rectangular area appears as the same color. This indicates to the fire fighter or user that the temperature associated with that numeral has been reached.

In this manner, the numeral 15 associated with area 11 would turn black for a temperature of 200 degrees F. The numeral associated with area 12 would vanish for a temperature of 300 degrees F. and so on.

Accordingly, the fire fighter, when looking at the indicating device, would not see any number in area 11 when he is operating in a temperature of 200 degrees F. The other numbers in areas 12, 13, and 14 would be visable and hence the user will immediately know that he is operating in a temperature range of at least 200 degrees F. As one can ascertain, the fact that the number changes color with temperature to match the colored black background associated with the rectangle immediately gives the user a positive indication of the temperature range he is operating in.

Such temperature sensitive lacquers as indicated are manufactured and distributed by many companies and suitable lacquers are available from Big Three Industries, Inc., Tempil Division, 2901 Hamilton Blvd., South Plainfield, NJ 07080. These lacquers or chemicals are particles which are temperature sensitive and which particles liquify or evaporate according to temperature. Such temperature sensitive lacquers or paints are available from any sources.

Figure 2:
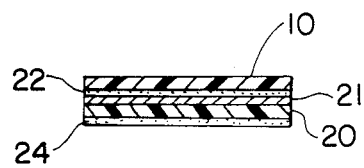
FIG. 2 is a cross sectional view taken through line 2—2 of FIG. 1.

Referring to FIG. 2, there is shown a partial cross section view depicting the construction of the unit. Essentially, as seen from FIG. 2, there is a bottom plastic layer 20. The layer 20 has secured thereto a porous paper sheet 21 which sheet may be black or the same exact color as the colored background imprint surrounding the numeral on the top sheet. The top of the black sheet 21 is then painted with a temperature sensitive lacquer 22. The temperature sensitive lacquer 22 is basically white or a light grey. This in turn is covered by the top sheet 10 which has imprinted thereon the surrounding black background and the central numeral.

Figure 3:
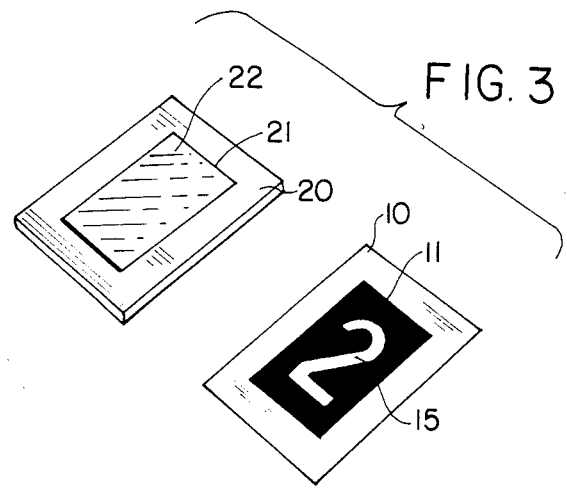
FIG. 3 is an assembly view of a temperature indicating area.

Referring to FIG. 3, there is shown a clearer diagram depicting how each area as areas 11 to 14 of FIG. 1 are formed. The thin bottom plastic sheet 20 has secured thereto the sheet 21 which is a black paper sheet. The top surface of the sheet is painted with the temperature sensitive lacquer 22. This is then covered with the plastic sheet 10 which contains a central portion having the numeral impressed thereon and which numeral is surrounded by a black rectangular area. The plastic sheet 10 is transparent or clear and may be for example made from Mylar or some other suitable high temperature plastic. Essentially, the lacquer employed to coat the black paper sheet 21 is a temperature sensitive lacquer or paint. As is known, paints are temperature sensitive and will blister, burn or evaporate at different temperature levels.

As indicated above, many manufacturers produce such paints which are utilized for temperature testing. If the paint is the type that evaporates, the bottom sheet 21 which is painted and which is black will become uncoated causing the numeral as numeral 15 to appear black. Thus the entire rectangular area as area 11 will now appear black indicating to the fire fighter that the temperature of the environment is 200 degrees F.

As one can ascertain, the entire sheet which is shown in FIG. 1 is made by securing four pieces of coated colored paper along the bottom sheet each defining the areas 11, 12, 13 and 14 and each associated with its own temperature range as dependent upon the lacquer used to cover or coat the associated paper sheet.

Referring back to FIG. 2, it is seen that the bottom plastic layer 20 may contain a layer of adhesive 24 to allow the entire strip assembly to be secured to an appropriate garment or surface.

Figure 4:
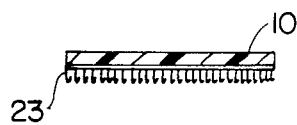
FIG. 4 is a side view showing a Velcro backing for the strip of FIG. 1.

Referring to FIG. 4, there is shown a strip as the strip 10 of FIG. 1 coupled to a Velcro backing 23. The use of the Velcro backing is a preferable technique for mounting the strip on a garment. As is known, the garment would have a corresponding Velcro strip sewn thereon and this strip would be positioned on the Velcro strip on the garment in a suitable location as described in greater detail in conjuction with FIG. 5.

Figure 5:
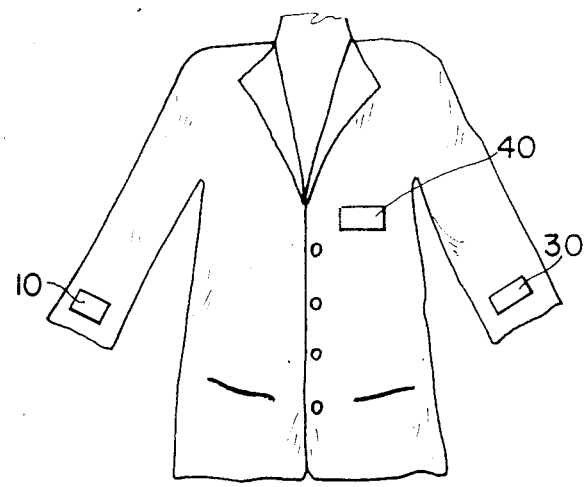
FIG. 5 is a perspective view of a garment incorporating the temperature indicating strip according to this invention.

Shown in FIG. 5, the strip 10 may be placed on the sleeve of a fire fighters coat or in any other convenient location to enable him to have constant access to the strip so that he can determine the operating temperature of the environment. A corresponding strip of Velcro as 30 may be permanently secured to the sleeve of the garment or in any other convenient position for viewing by the fire fighter so that he can have continuous visual access to the strip to determine the temperature of the environment in which he is working.

There may be other similar strips as 40 emplaced on the front or back of the garment to enable other fire fighters to visualize the same and to inform the fire fighter of a dangerous condition. In any event, based on the above, as one can understand, the utilization of the above described strip with the temperature sensitive lacquer gives the fire fighter a positive indication of an operating temperature range due to the lacquer evaporating. In this way the numeral appears as the same exact color as the border surrounding the numeral. In this manner the numeral actually disappears when the temperature range is achieved.

Thus the fire fighter can immediately determine the operating temperature range without worrying about color or shades as for example which are accommodated by typical liquid crystal devices. Thus the strip which is flexible as made from a thin plastic high temperature material is relatively economical and, as above explained, is easy to secure to a fire fighter's garment to provide a visual indication of operating temperature.

I claim:

1. A temperature indicating device comprising:
a multilayered sheet material comprising a top layer and a bottom layer, said top layer being a transparent flexible material having imprinted on a surface thereof a plurality of defined colored areas, with each of said areas associated with a reference numeral, where each reference numeral is surrounded by said imprinted color area, said bottom layer having secured thereto a plurality of lacquered members each associated with a given one of said given areas, with each one of said lacquered members underlying an associated one of said given areas to allow said user to view said reference numeral as surrounded by said color area, each of said lacquered members coated with a lacquer which evaporates at a given temperature different from that of another member, said lacquer on each of said lacquered members acting when said given temperature is reached to evaporate to cause said member to assume the color of said colored area to thereby effectively prevent one from viewing said numeral to give one an indication of the temperature achieved when said numeral cannot be viewed.

2. The temperature indicating device according to claim 1, wherein said lacquered number includes a bottom planar member of color substantially the same as said color imprinted on said top layer defining said area, with the surface of said planar member as facing said top layer being coated with said temperature sensitive lacquer.

3. The temperature indicating device according to claim 2, wherein said color is black.

4. The temperature indicating device according to claim 3, wherein said lacquer is a light grey color.

5. The temperature indicating device according to claim 1, further including an adhesive layer secured to the underside of said bottom layer to allow said device to be attached to a surface.

6. The temperature indicating device according to claim 1, further including a Velcro layer secured to the underside of said bottom layer to allow said device to be attached to the surface of an object having secured thereto a corresponding Velcro layer.

7. The temperature indicating device according to claim 6, wherein said object is a fire fighter's garment such as a fire fighter's coat.

8. The temperature indicating device according to claim 2, wherein said bottom planar member is fabricated from a colored paper.

9. The temperature indicating device according to claim 1, wherein said top and bottom layers are fabricated from a high temperature plastic.

10. A method for informing a fire fighter of the temperature in which he is working, comprising the steps of:
securing to the garmet of said fire fighter a display strip having imprinted thereon a plurality of areas each indicative of a given temperature and each associated with a visual reference numeral indicative of said given temperature,
surrounding said numeral with a given color to allow said numeral to visually stand out, changing the color of said numeral to said given color when said temperature is reached to thereby prevent one from viewing said numeral.

11. The method according to claim 10, wherein said plurality of areas are four areas with a first indicative of a temperature of 200 degrees F., a second of 300 degrees F., and third of 400 degrees F., and a fourth of 500 degrees F.

12. The method according to claim 10, wherein said color is black.

13. The method according to claim 10, wherein said step of securing includes placing a Velcro strip on said garment and placing a corresponding Velcro strip on the back of said display strip and securing said display strip to said garment via said Velcro strips.

14. The method according to claim 10, wherein the step of securing includes coating the back of said strip with an adhesive to apply said strip to said garment.

* * * * *